United States Patent

[11] 3,633,082

[72] Inventors Hidenobu Hasegawa
Kurita-gun;
Zenji Kusuda, Ibaragi-shi; Akira Tanaka,
Takatsuki; Jinichiro Noritani, Sakai, all of
Japan
[21] Appl. No. 74,947
[22] Filed Sept. 24, 1970
[45] Patented Jan. 4, 1972
[73] Assignee Matsushita Electronics Corporation and
Matsushita Seiko Co., Ltd.
Osaka, Japan
[32] Priority Oct. 3, 1969
[33] Japan
[31] 44/79523

[54] CONTROL CIRCUIT FOR DRIVING, STOPPING
AND RESTARTING A VARIABLE SPEED SINGLE-
PHASE INDUCTION MOTOR
4 Claims, 4 Drawing Figs.
[52] U.S. Cl. .................................................. 318/212,
318/220 R, 318/225 R
[51] Int. Cl. ....................................................... H02p 3/18
[50] Field of Search ............................................ 318/220 R,
221 R, 222 D, 225 R, 209-212

[56] References Cited
UNITED STATES PATENTS
2,073,532   3/1937   Ballman .................... 318/225 R X
2,774,924  12/1956   Witt ........................... 318/225 R X
2,922,097   1/1960   Choudhury ................. 318/212

Primary Examiner—Gene Z. Rubinson
Attorney—Stevens, Davis, Miller & Mosher

ABSTRACT: A control circuit for driving, stopping and restarting a variable speed single-phase induction motor, in which when said motor is stopped from a running state by a DC braking means, the full voltage of the AC power source available for restarting the motor only for a predetermined time interval after it is stopped, regardless of the state of the running speed just before the stoppage. Three switches are provided for selectively connecting the AC power source, a DC power source for braking the motor, whereby the full starting torque is available to restart the motor in any state of the speed setting of the motor.

H. HASEGAWA
Z. KUSUDA, A. TANAKA
& J. NORITANI  INVENTORS

BY Stevens, Davis, Miller & Mosher
ATTORNEYS 3,633,082

CONTROL CIRCUIT FOR DRIVING, STOPPING AND RESTARTING A VARIABLE SPEED SINGLE-PHASE INDUCTION MOTOR

This invention relates to a drive control circuit for a single-phase induction motor.

An electric fan has been developed which is so remarkably improved in performance that the human body is protected from injury by rapidly stopping of the rotation of the fan in the event a person inadvertently approaches the rotating blades. Also, a low-speed control is provided to enable the fan to be used even during the sleeping hours. In such an electric fan, however, the inconvenience is that the fan which has been quickly stopped after low-speed running cannot be restarted because the static torque exceeds the starting torque.

Accordingly, it is an object of the present invention to provide a drive control circuit which assures the restart of a single-phase induction motor which has been stopped after low-speed running.

Another object of the present invention is to provide a drive control circuit which has a wider range of speed control for a single-phase induction motor.

The above and other objects, features and advantages will be made apparent by the detailed description taken in conjunction with the accompanying drawings, in which.

Figure 1:
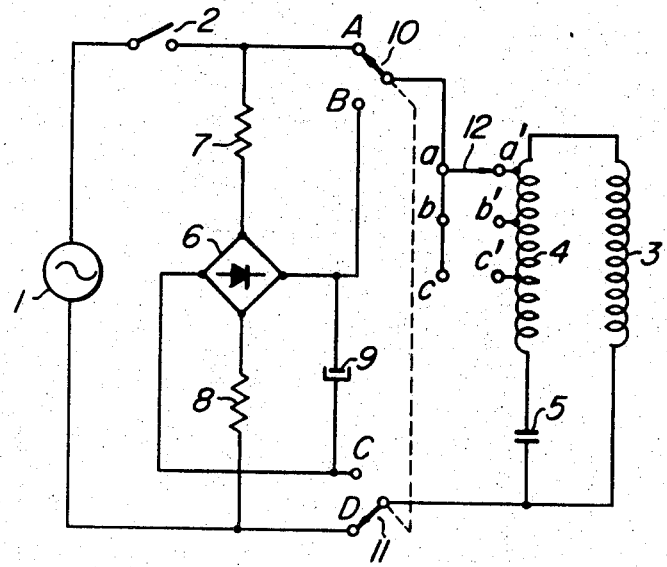
FIG. 1 is a diagram showing a drive control circuit for the conventional single-phase induction motor.

Referring to FIG. 1 which shows a drive control circuit of the conventional electric fan, the reference numeral I shows a commercial power supply, the numeral 2 a power switch, the numeral 3 a primary winding of a single-phase induction motor, the numeral 4 a secondary winding, the numeral 5 a running capacitor, the numeral 6 a rectifying circuit, the numerals 7 and 8 current-limiting resistors, the numeral 9 a smoothing capacitor, the numerals 10 and 11 relays for energizing the drive control circuit by detecting contact of any part of a human body with the guard of the electric fan, and the numeral 12 a movable contact for speed control.

In the above-mentioned circuit, the relays 10 and 11 are usually closed at the sides of A and D respectively and hence, by closing the power switch 2, the primary winding 3 and the secondary winding 4 are supplied with an AC voltage from the commercial power supply 1. The speed control of the single-phase induction motor is attained by operating the movable contact 12, the rotational speed of the single-phase induction motor being maximum when the terminals $a$ and $l'$ are connected with each other and minimum when the terminals $c$ and $c'$ are connected with each other.

It is very dangerous to touch the guard of the rotating blades of the single-phase fan while the induction motor is running. Such contact of a human body with the guard is detected by the relays 10 and 11, which switch to contacts B and C respectively, and a DC voltage is applied to the windings of the single-phase induction motor from the rectifying circuit 6, whereby the single-phase induction motor is braked to quickly stop the rotation. That is to say, the danger which would be apparent if the single-phase induction motor continues running is eliminated. After the human body has been separated from the guard, the relays 10 and 11 switch back to contacts A and D, thereby causing an AC voltage to be applied again to the induction motor.

In the above-mentioned arrangement of the drive control circuit, since the movable contact 12 connects the terminals C and C' with each other, the single-phase induction motor is inconveniently unable to be restarted after the aforementioned protective operation if such an operation is conducted during very low speed rotation of the single-phase induction motor. This is because the static torque exceeds the starting torque and the single-phase induction motor holds the static state in spite of an AC voltage being applied to it.

Figure 2:
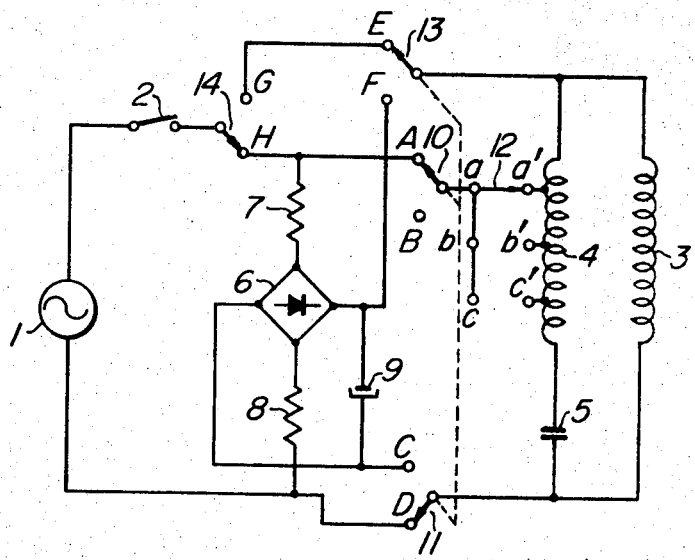
FIG. 2 shows a drive control circuit for a single-phase induction motor according to the present invention.

A drive control circuit according to the present invention is illustrated in FIG. 2, which features an addition of the relays 13 and 14 to the drive control circuit as shown in FIG. 1. The relay 13 is interlocked with the relays 10 and 11, the relay 14 being adapted to operate a certain time behind the above-mentioned relays. Under normal conditions, the relays 10, 11, 13 and 14 are switched to contacts A, D, E and H respectively and as a result the closing of the power switch 2 causes an AC voltage to be applied to the windings of the single-phase induction motor to rotate them.

While the induction motor is running at the single-phase lowest speed with the movable contact 12 connecting the terminals C and C' with each other, the relays 10 to 14 are operated as explained below by a braking command to ensure restarting of the single-phase induction motor.

Figure 3:
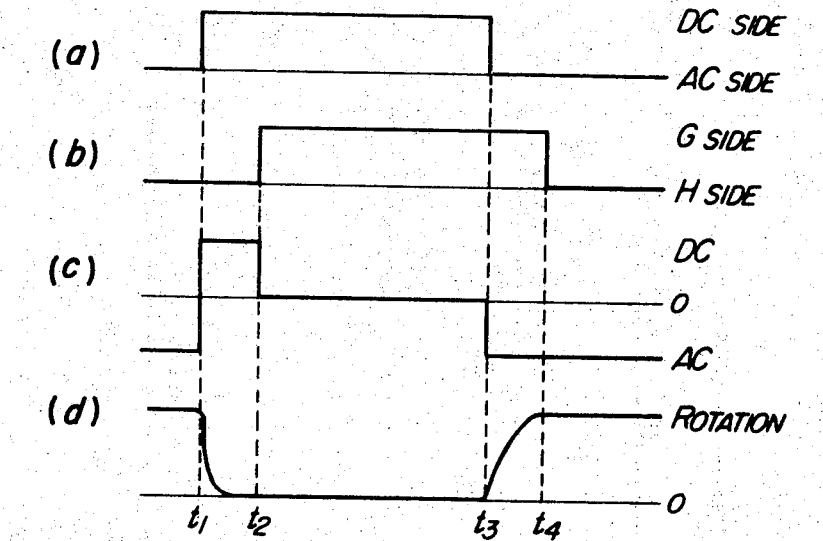
FIG. 3 shows a diagram for explaining the operation of the circuit shown in FIG. 2.

Referring to FIG. 3, the symbol a shows a diagram of the operations of the relays 10, 11 and 13, the symbol b the operation of the relay 14, the symbol c the motor current and the symbol d the rotation of the single-phase induction motor. Assume that a human body touches the guard of the fan blades at time $t_1$, generating a dangerous situation. The relays 10, 11 and 13 switch to the contacts B, C and F respectively, At this time, the relay 14 remains connected to contact H. Then, the output of the rectifying circuit 6 is applied to the contacts C and F and a DC current flows in the windings of the single phase induction motor as shown in FIG. 3c, whereby the braking force is applied to the single phase induction motor and its rotation is sharply reduced and finally stopped (see FIG. 3d). On the other hand, the relay 14 switches to the contact G at time $t_2$ (see FIG. 3b) when the windings of the single phase induction motor are disconnected from the circuit. This state is held until the danger is eliminated. With the stoppage of the induction motor and the resulting elimination of the danger at time $t_3$, the relays 10, 11 and 13 again switch to contacts A, D and E respectively. However, since relay 14 still remains connected to contact G, the windings of the single phase induction motor are supplied with an AC voltage through the relays 13 and 14.

Consequently, irrespective of the connection of 30 the movable contact 12 between terminals C and C', the single-phase induction motor restarts its rotation under the same condition as that in a high-speed run, the static torque not exceeding the starting torque. At time $t_4$ after passing a certain time from time $t_3$ when the single-phase induction motor started rotating, the relay 14 switches to contact H, which switches the path of a voltage to the windings of the induction motor with a voltage applied to them through the contact 12. As a result, the single-phase induction motor subsequently rotates at a speed which corresponds to the position of the tap of the auxiliary secondary winding connected with the movable contact 12. The above-mentioned operations depend on the control circuit as shown in FIG. 4.

Figure 4:
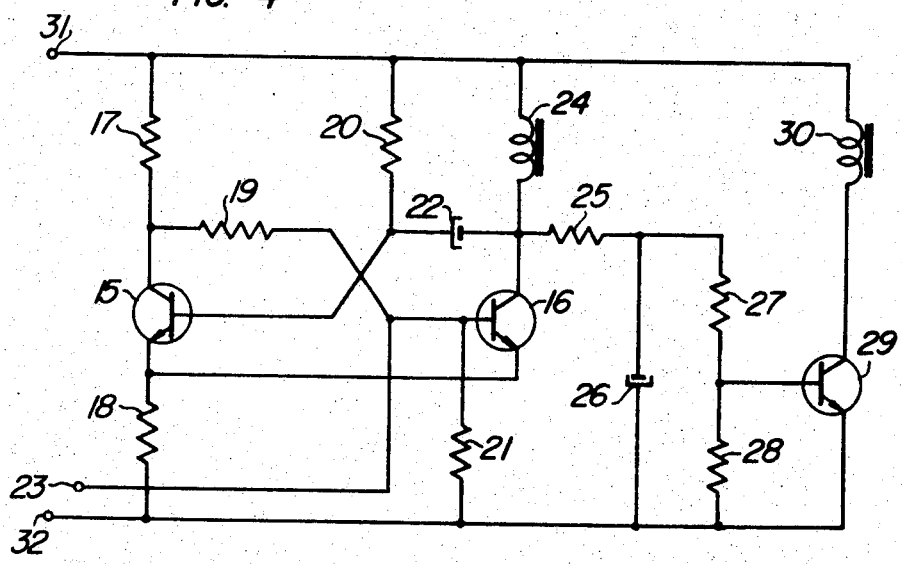
FIG. 4 shows a diagram of a control circuit for controlling the relay operation of the circuit shown in FIG. 2.

Referring now to FIG. 4, the numerals 15 and 16 show transistors making up a monostable multivibrator, the numeral 17 a collector resistor of the transistor 15, the numeral 18 an emitter resistor thereof, the numeral 19 a DC feedback resistor, the numeral 20 a base bias resistor of the transistor 15, the numeral 21 a base bias resistor of the transistor 16, the numeral 22 a capacitor for AC feedback, the numeral 23 an input terminal for a signal applied from a detector circuit (not shown in the drawing) which detects a contact of a human body with the fan guard, the numeral 24 a winding for the relays 10, 11 and 13, the numerals 25 and 26 a current-limiting resistor and a capacitor respectively, the numerals 27 and 28 dividing resistors to divide the voltage across the capacitor 26, the numeral 29 a switch transistor which receives a base bias due to the dividing resistors, the numeral 30 a winding of the relay 14 and the numerals 31 and 32 DC voltage terminals.

In this circuit, usually, the transistor 15 is in a conduction state and the transistor 16 in a cutoff state. As a result, the capacitor 26 is charged to the level of the DC source voltage, and the transistor 29 is conducting. In other words, the current to the relay winding 24 is cut off, while a current is flowing through the relay winding 30. Under these conditions, the relays 10, 11 and 13 are switched to the contacts A, D and E respectively, the relay 14 being switched to the contact H.

When a human body touches the fan guard, a trigger signal is applied to the terminal 23 and the monostable multivibrator is energized, which reverses the states of transistors 15 and 16. Thus the transistor 16 begins to conduct, with a result that a current flows in the winding, thereby causing the relays 10, 11 and 13 to switch to the contacts B, C and F respectively. With the conduction of the transistor, the capacitor 26 begins to discharge, and when the voltage across its terminals drops to a predetermined level, the transistor 29 is cut off and therefore the current stops flowing in the winding 30 of the relay 14, with a result that the relay 14 selects the contact G. It follows that the time required for the contact G to be selected is equivalent to the period from $t_1$ to $t_2$ as shown in FIG. 3.

When the trigger signal is cut off, the transistor 16 is restored to a cutoff state, but by a certain time after the cut off of the trigger signal, the transistor 29 returns to the original state due to the presence of the capacitor 26. The result is that the time when the relay 14 is switched back to the contact H naturally comes a certain time behind the time when the contacts of the relays 10, 11 and 13 return to their original states.

As can be seen from the above description, through the operation of the relay contacts as shown in the circuit of FIG. 2, the induction motor is started positively from the static state even after very low speed running. Therefore, it is apparent that the drive control circuit according to the present invention not only remarkably widens the speed control range but also the scope of application of a single phase induction motor.

Although the above description was made in connection with an electric fan, the device of the present invention can be applied to a wide variety of drive controls for a single-phase induction motor which require restarting after stoppage. In particular, the effect of the invention is important in performing said operations after slow speed running.

What is claimed is:

1. A control circuit for driving, stopping and restarting a variable speed single-phase induction motor having a field means including a primary winding and a secondary winding having a plurality of taps adapted for variable speed operation, said field means being adapted to be energized by DC power for producing a braking effort to stop the motor rotation, an AC power source, a rectifier means for producing said DC power, a tap changer means for selecting a desired one of said taps, said control circuit comprising:
   a first switch means movable between first and second positions,
   a second switch means movable between third and fourth positions, said tap-changer means being connected to said AC source through the third position of said second switch means and the first position of said first switch means, said first switch means being interlinked with said second switch means so as to be moved between said first and second positions with a predetermined time interval as said second switch means is moved between said third and fourth positions, respectively,
   a third switch means movable between fifth and sixth positions as said second switch means is moved to said third and fourth positions respectively, said field means being connected to said AC source at said fifth position through said second position of said first switch means and being connected directly to the output of said rectifier means at said sixth position.

2. A control circuit according to claim 1, further comprising:
   a switch control circuit comprising first and second relay means, said first relay means adapted to be energized so as to operate said second and third switch means, said second relay means being interlinked with said first relay means so as to operate said first switch means with said predetermined time interval after the operation of said first relay means.

3. A control circuit according to claim 2, said switch control circuit further comprising a monostable multivibrator for energizing said first relay means responsive to a breaking command, and a switching circuit for energizing said second relay means, said switching circuit being operated by said multivibrator with said predetermined time interval after the energization of said first relay means.

4. A control circuit according to claim 3, said monostable multivibrator including two transistors, said first relay means including at least one relay coil connected to a collector circuit of one of said two transistors, said switching circuit including a switch transistor being operated by said multivibrator, said second relay means being connected to a collector circuit of said switch transistor.

* * * * *